May 30, 1967  W. KOHLHAGEN  3,322,987
SELF-STARTING ROTORS FOR SYNCHRONOUS REACTION MOTORS
Filed Sept. 14, 1964  2 Sheets-Sheet 1

INVENTOR.
Walter Kohlhagen
BY
Attorney.

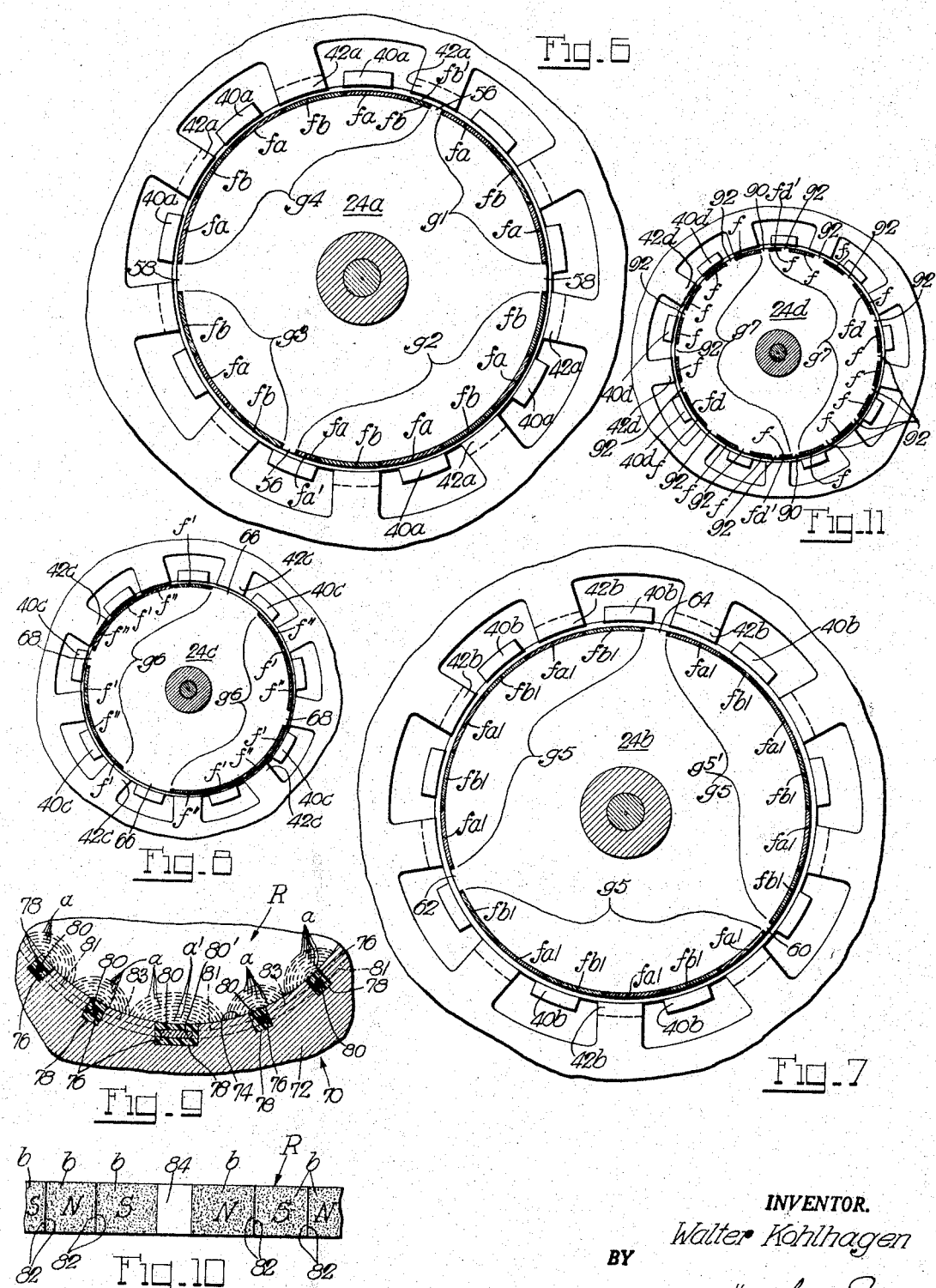

United States Patent Office 3,322,987
Patented May 30, 1967

3,322,987
SELF-STARTING ROTORS FOR SYNCHRONOUS REACTION MOTORS
Walter Kohlhagen, 818 Oakley Ave., Elgin, Ill. 60120
Filed Sept. 14, 1964, Ser. No. 396,333
19 Claims. (Cl. 310—164)

This invention relates to synchronous reaction motors in general, and to rotors of self-starting type therefor in particular.

The motor to which the present invention pertains is of the well known kind having a multi-polar field of which alternate poles are of opposite polarity at any given instant and change their polarities in phase with an alternating current supplied to an associated field coil, and a permanent-magnet rotor the pole faces of which cooperate with the field poles in driving the rotor in synchronism with the alternation of the current. To render this kind of motor self-starting, the pole faces of prior rotors and their associated field poles have been coordinated in various different ways so that the rotors will be subjected to unbalancing magnetic forces for their self-start on excitation of their fields.

In my copending application Ser. No. 77,073, filed Dec. 20, 1960, now Patent No. 3,149,256, dated Sept. 15, 1964, there are shown a number of self-starting rotors that are characterized by pole faces which are substantially continuous with each other throughout the rotor peripheries, with the requisite pole face unbalance relative to the associated field poles for rotor self-starting being achieved by making at least some pole faces of different widths. These rotors are quite advantageous not only because they make maximum use of their peripheries for the pole face formation, but also because they permit most any unbalanced arrangement of their pole faces for reliable self-starting from any position, including their worst starting positions in which they are coincident with any of their running positions of minimum reluctance relative to the associated field poles.

It is among the objects of the present invention to provide rotors of a type which have all the advantages of my aforementioned prior rotors, yet neither require substantial continuity of the pole faces throughout their peripheries nor rely solely on pole faces of different widths in order to achieve the overall pole face unbalance required for self-starting, by providing between same of the otherwise substantially continuous peripheral pole faces preferably more than one non-polarized gap or area which, alone or in combination with some pole faces of different widths, provide for most any overall unbalance of the pole faces for self-starting.

It is another object of the present invention to provide rotors of the aforementioned non-polarized gap type which have an equal number of north and south pole faces thereby to permit full magnetization of the pole faces, especially with preferred high coercive rotor magnet materials, for best starting and running flux and also for substantial balance of the radial forces acting on the rotors.

It is a further object of the present invention to provide rotors of this type which have an equal number of north and south pole faces as aforementioned, with the overall number of pole faces being equal to or less than the number of associated field poles.

Another object of the present invention is to provide alternative rotors of this type with equal numbers of north and south pole faces, of which all pole faces are spaced from each other by non-polarized gaps or areas, with these gaps being either of different widths to provide, solely or in combination with pole faces of different widths, for overall unbalance of the pole faces for self-starting, or being of equal width for sharply defining a majority of pole faces widthwise and spacingwise more or less in accord with the associated field poles for their optimum cooperation therewith in starting and running of the rotors, with a few pole faces of different width then providing for the overall pole face unbalance for self-starting.

Other objects and advantages will appear to those skilled in the art from the following, considered in conjunction with the accompanying drawings.

In the accompanying drawings, in which certain modes of carrying out the present invention are shown for illustrative purposes:

FIG. 6 is a fragmentary front view of a motor with a further modified field and a modified rotor;

FIG. 7 is a fragmentary front view of a motor with another modified rotor;

FIG. 8 is a fragmentary front view of a motor with a further modified rotor;

FIG. 9 is a fragmentary section through a fixture in which the rotors of the present invention may be magnetized;

FIG. 10 is a fragmentary side view of the exemplary rotor magnetized in the fixture of FIG. 9; and FIG. 11 is a fragmentary front view of a motor with still another modified rotor.

Figure 1:
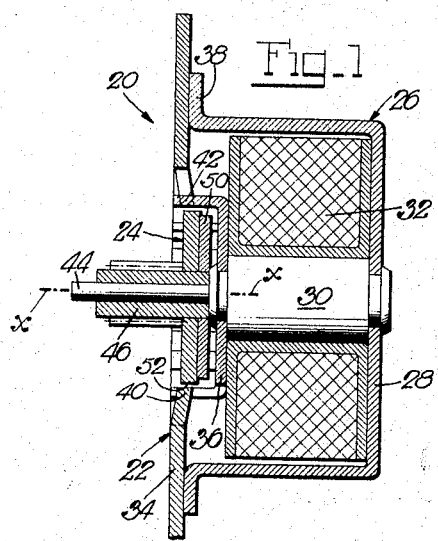
FIG. 1 is a longitudinal section through a synchronous motor having a rotor which embodies the present invention.
Figure 2:
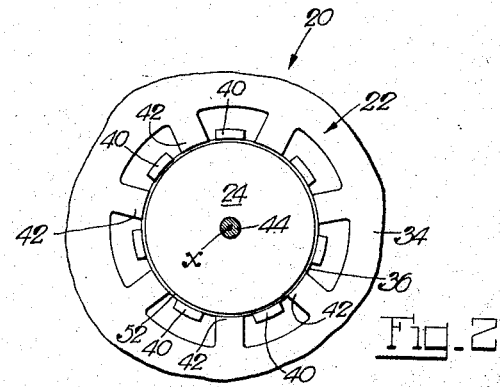
FIG. 2 is a fragmentary front view of the same motor.

Referring to the drawings, and more particularly to FIGS. 1 and 2 thereof, the reference numeral 20 designates a synchronous motor having a field 22 and a rotor 24. The field 22 presently comprises a housing 26 of general cup shape to the bottom 28 of which is secured a center core 30, a field coil 32 in the housing 26 and surrounding the core 30, and outer and inner field plates 34 and 36 which are suitably secured to a top flange 38 of the housing 26 and to the outer end of the center core 30, respectively. The outer and inner field plates 34 and 36 are provided with sets of inner and outer field poles 40 and 42, respectively, which are circularly arranged about a rotor axis $x$ and of which successive poles of one set alternate with successive poles of the other set in conventional manner.

Figure 3:
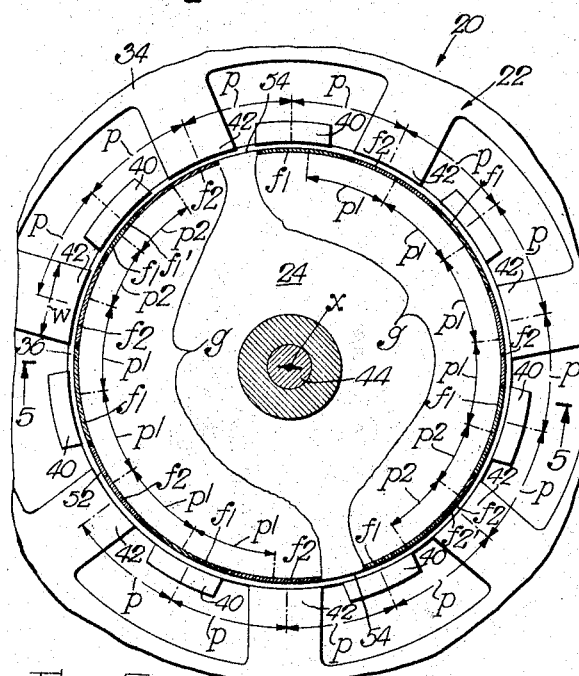
FIG. 3 is an enlarged fragmentary front view of the same motor for clearer illustration of the relation of the rotor and field poles.

Extending from the center core 30 is a rotor shaft 44 on which is journalled a pinion 46 to which is suitably attached, as by a snug fit, the rotor 24 and also a conventional flywheel 50. The pinion 46 may directly drive a load or may be part of a first stage of any desired gear reduction (not shown). The rotor 24 is a permanent magnet provided on its periphery with series of pole faces $f1$ and $f2$ of opposite polarities, respectively, which for the sake of clear illustration are indicated by differently sectioned parts of a peripheral margin of the rotor (FIG. 3). The rotor 24 is self-starting as will be fully explained hereinafter.

In operation of the motor, alternating current is supplied to the field coil 32 to produce in the field poles 40 and 42 opposite instantaneous polarities which change in phase with the alternating current, with the rotor pole faces $f1$ and $f2$ cooperating with the field poles in driving the rotor in synchronism with the alternation of the current in a manner which is conventional with motors of this type.

Figure 4:
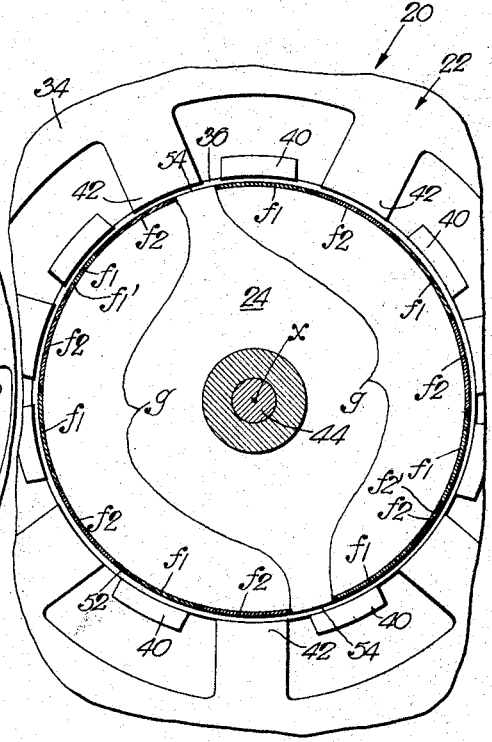
FIG. 4 is a view similar to FIG. 3, showing the rotor in a different position in the field.

Reference is now had to FIGS. 3 and 4 which show the field poles 40, 42, and also the rotor 24 at an enlarged scale. The arrangement of the field poles 40 and 42 may be entirely conventional. As already mentioned, the field poles 40 and 42 of the respective sets are arranged circularly about the rotor axis $x$, with successive poles of either set alternating with successive poles of the other set. Further, the pitch $p$ between successive field poles is preferably the same throughout. Also, all field poles are preferably of the same peripheral width $w$.

The permanent-magnet rotor 24 of the present invention has a cylindrical periphery 52 with polarized and non-polarized areas of peripheral widths of which the polarized areas form the pole faces $f1$ and $f2$ while the nonpolarized areas 54 divide the pole faces $f1$ and $f2$ into a plurality of spaced groups $g$, in this instance two groups, of which the pole faces of each group are substantially continuous with each other. In this instance also, the two pole face groups $g$ are identical in point of number of pole faces and their pitch relation, and the non-polarized rotor areas 54 are of identical peripheral widths so that the pole face groups $g$ are also diametrically opposite each other. Further the pole faces of the exemplary rotor 24 are equal in number to the field poles 40 and 42. In this instance, a predominant number of the pole faces of each group are spaced at a pitch $p1$ substantially equal to the field pole pitch $p$, while the remainder, in this instance one pole face in each group, are spaced from their nearest neighbors at a pitch $p2$ which is other than, and in this instance smaller than, the field pole pitch $p$. Thus, there are among the pole faces of the respective groups $g$ the pole faces $f1'$ and $f2'$ of opposite polarities which are spaced at less than the field pole pitch and, hence, are of smaller peripheral width than the remaining pole faces. With the narrower pole faces $f1'$ and $f2'$ being in this instance next to endmost pole faces in the respective groups $g$, these narrower and adjacent endmost pole faces in the groups provide the overall unbalance in the pole face arrangement or pattern which lend the rotor good self-starting characteristics. Thus, with the rotor 24 seeking, on deenergization of the field coil 32, a likely repose position (FIG. 3) in which its pole faces are at or near optimum attraction to adjacent field poles of opposite polarities of whatever retentive magnetic strength they may have until their next polarization on coil reenergization, the narrower and adjacent endmost pole faces in each group are sufficiently unbalanced with respect to their nearest field poles, i.e., sufficiently out of alignment therewith, to be powerfully attracted to and repelled from their nearest field poles on reenergization of the field coil 32, with the rotor in consequence either taking off immediately in either direction or, if not taking off immediately, becoming sufficiently unstable and being set into vibration to take off assuredly on the very next or next few following polarity changes of the field poles.

While the exemplary rotor 24 will more likely than not seek a repose position like or similar to that of FIG. 3 owing to the aforementioned retentive polarities of the field poles during motor stops, the rotor will start with even greater vigor from any other occasional repose position in which the overall unbalance of the rotor pole faces relative to the field poles is even greater than in FIG. 3, as will be readily understood. However, and as already explained, the exemplary rotor 24 will assuredly start from its most frequent repose positions like or similar to that of FIG. 3, which is nearly coincident with one of its momentary running positions of minimum reluctance (FIG. 4), wherefore the rotor is a reliable self-starter from any and all repose positions, including a repose position coincident with any of its running positions of minimum reluctance.

The exemplary rotor 24 of FIGS. 3 and 4 is also suggestive of certain modifications. Thus, it is fully within the purview of the present invention to interpose the narrower pole faces $f1'$ and $f2'$ in the groups between other equal-width pole faces, such as between two endmost and the remaining equal-width pole faces in each group, for example, for a different overall unbalance of the pole faces relative to the field poles. Also, the non-polarized rotor areas 54 may be of different widths, though equal widths of the same as shown is preferred for diametrically opposite disposition of the pole face groups. Further preferred is the arrangement of the pole face groups so that the full-width and narrow-width pole faces in one group follow each other unidirectionally in the same order as in the other group as shown, whereby the equal-width pole faces of one group are diametrically opposite the equal-width pole faces of the other group, and the narrower pole faces $f1'$ and $f2'$ of both groups are also diametrically opposite each other. It is, of course, within the general teaching of the present invention to arrange the pole faces of each group of most any different widths in toto or in part and even have different pole face patterns in the individual groups, as long as the overall unbalance of the pole faces relative to the field poles is adequate for rotor self-starting.

Figure 5:
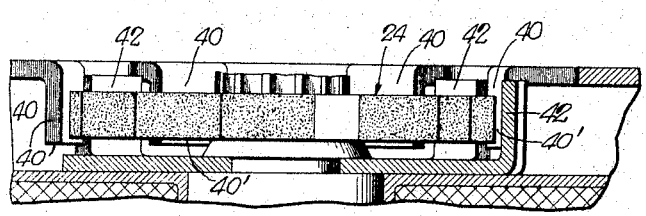
FIG. 5 is a fragmentary section through a motor showing the rotor of FIGS. 3 and 4 in a somewhat modified field.

While in the described motor of FIGS. 1 to 4 the effective areas of the inner field poles 40 are limited by the thickness of the outer field plate 34, and the rotor 24 may, for optimum economy of its permanent-magnet material, be limited in its thickness substantially to that of the outer field plate 34, FIG. 5 shows a modified field in which the rotor 24 may operate with maximum efficiency regardless of its thickness. Thus, the field of FIG. 5 may be like the field of FIGS. 1 and 2, except that the active parts of the inner field poles 40 extend axially at 40', the same as the outer field poles 42. With this arrangement, the rotor of FIG. 5 may be considerably thicker than the rotor of FIG. 1 and within the same field pole space develop correspondingly greater torque, as will be readily understood.

The described rotor 24 (FIG. 3) is of a general type, within the precepts of the present invention, which is rendered self-starting by an overall pitch relation of its pole faces which is different from that of the field poles.

Reference is now had to FIG. 6 which shows a different permanent-magnet rotor 24a of the same general type in a field the field poles 40a and 42a of which number more than the field poles in FIGS. 1 to 4 and are preferably arranged axially as in FIG. 5. Thus, there are in the present example 18 field poles, i.e., nine field poles 40a and nine field poles 42a, and the exemplary rotor 24a has the same number of 18 pole faces $fa$ and $fb$ of opposite polarities, with the number of pole faces of one polarity being equal to the number of pole faces of the opposite polarity, and all successive pole faces being of opposite polarities. The pole faces $fa$ and $fb$ are formed by polarized peripheral rotor areas which in the present instance are interrupted by two pairs of non-polarized peripheral areas 56 and 58 that divide the pole faces into four groups $g1$, $g2$, $g3$ and $g4$, of which the groups $g1$ and $g3$ are identical and diametrically opposite each other and the groups $g2$ and $g4$ are also identical and diametrically opposite each other, with the pole faces of each group being also substantially continuous with each other. All of the pole faces, in this instance three, of each of the groups $g1$ and $g3$ are of identical peripheral widths and spaced substantially at the field pole pitch, while a predominant number of the pole faces of each of the other groups $g2$ and $g4$ are also of identical peripheral widths and spaced substantially at the field pole pitch, with the remaining pole faces $fa'$ and $fb'$ in the groups $g2$ and $g4$ being of smaller peripheral widths and spaced from their nearest neighbors in the respective groups at a pitch smaller than the field pole pitch.

The rotor 24a is shown (FIG. 6) in one of its likeliest repose positions in which its pole faces have maximum, or near maximum, attraction to the nearest pole faces of retentive opposite polarities. In this rotor repose position, the pole faces of the groups g1 and g3 are far more out of alignment with the nearest field poles than are the more numerous pole faces of the other groups g2 and g4 out of alignment with their nearest field poles. Accordingly, while the pole faces of the groups g2 and g4 of the rotor in its exemplary repose position will, on field coil reenergization, contribute more or less to a self-start of the rotor, the pole faces of the other groups g1 and g3, being way out of alignment with their nearest field poles with each in fact overlapping parts of two adjacent field poles, are the primary rotor starters because they will be subjected to powerful attractive and repulsive forces from the field poles, with the result that the rotor will take off immediately in either direction or, if not taking off immediately, will assuredly take off on the next or next few succeeding polarity changes of the field poles, as will be readily understood.

The overall pole face unbalance of the present self-starting rotor 24a with its all-but-two equal-width pole faces is achieved primarily by the non-polarized rotor areas 58 which angularly displace the pole face groups g1 and g3 from the respective pole face groups g2 and g4 sufficiently so that the fewer equal-width pole faces of the groups g1 and g2 are considerably out of alignment with their nearest field poles, and in fact overlap parts of two adjacent field poles, when the greater number of equal-width pole faces of the other groups g2 and g4 are in alignment with adjacent field poles, as may readily be visualized in FIG. 6. The other non-polarized rotor areas 56 are provided in this instance to keep the narrow-width pole faces fa' and fb' at any desired limited width. These non-polarized areas 56 may even be omitted, in which case the pole faces fa' and fb' would be substantially continuous with both adjacent pole faces but would still be narrower-width pole faces compared with all other pole faces owing to the provision of the non-polarized rotor areas 58 for the requisite overall pole face unbalance for rotor self-starting, as explained. The narrower-width pole faces fa' and fb' must be provided in the exemplary pole face arrangement of the present rotor 24a in order to obtain, by peripheral rotor magnetization to be explained, opposite polarities of all successive pole faces and hence, highly desirable diametrically opposite pole faces of opposite polarities in the exemplary field in which diametrically opposite field poles are also of opposite polarities when excited.

While in the described rotors 24 and 24a of FIGS. 3 and 6 the great majority of pole faces of the groups are of identical width and spaced substantially at the field pole pitch, and a minimum of two pole faces are of narrower width and spaced from their nearest neighbors in the respective groups at a pitch smaller than the field pole pitch, FIG. 7 shows a rotor 24b in which all pole faces fa1 and fb1 are of identical width and the substantially continuous pole faces in each of the exemplary 3 groups g5 are spaced at a pitch smaller than the field pole pitch. The pole faces fa1 and fb1 are again equal in number to the field poles 40b and 42b, successive pole faces throughout are of opposite polarities, and the number of pole faces of one polarity is equal to the number of pole faces of the opposite polarity. The pole faces are divided into the exemplary three groups g5 by non-polarized peripheral rotor areas 60, 62, and 64 of different widths for angular displacement of the pole face groups from each other to different extents for achieving adequate overall unbalance of the pole faces relative to the field poles for rotor self-starting. Thus, while the pole faces of the group g5' are shown in substantial optimum alignment with adjacent field poles, the pole faces of the two remaining groups are appreciably displaced from optimum alignment with field poles and each of a plurality of these pole faces is even in overlap with parts of two adjacent field poles, thus providing adequate overall unbalance in the pole face arrangement for reliable self-starting of the rotor from any repose position.

While in the described rotors 24, 24a, and 24b of FIGS. 3, 6 and 7 the number of pole faces is equal to the number of field poles, it is also fully within the purview of the present invention to provide a rotor which has fewer pole faces than there are field poles in the associated field. Thus, the exemplary rotor 24c in FIG. 8, which is in a field with 18 field poles 40c and 42c, has but 14 pole faces f' and f" of opposite polarities, respectively, which are formed by polarized peripheral areas of the rotor, with the rotor periphery having also 2 pairs of non-polarized areas 66 and 68. The non-polarized rotor areas 66 divide the pole faces into two groups g6 which in this instance are identical and also diametrically opposite each other, while the non-polarized rotor areas 68 divide the pole faces of the respective groups g6 into spaced sub-groups of substantially continuous pole faces which, in this instance, are spaced substantially at the field pole pitch. Accordingly, all pole faces are of identical width, and the non-polarized rotor areas 68 angularly displace the sub-groups of the respective pole face groups g6 from each other to provide for the overall pole face unbalance relative to the field poles for rotor self-starting. Thus, the pole faces of two diametrically opposite sub-groups of the groups g6 are shown in FIG. 6 in alignment with adjacent field poles so as to demonstrate the wide disalignment of the pole faces of the other sub-groups from the nearest field poles and the extension of each of these pole faces in overlap with two adjacent field poles, owing to the spacing of the sub-groups of each pole face group g6 by the non-polarized rotor area 68. The present rotor 24c is thus a reliable self-starter because a sufficient number of its pole faces will on field coil reenergization be subjected to a powerful attractive and repelling forces from the field poles that the rotor will quickly self-start from any repose position.

It is significant that in reducing the number of pole faces of the exemplary rotor 24c below the number of field poles, the pole faces number four less than the field poles. This is due to the fact that at each of the non-polarized rotor areas 66 intended for pole face elimination two successive pole faces will be of opposite polarities ensuing from peripheral magnetization of the rotor described hereinafter. Hence, while it would be possible to reduce the number of pole faces of the exemplary rotor 24c to two less than the number of field poles by providing only one of the non-polarized rotor areas 66 and having two successive pole faces in lieu of the other non-polarized rotor area 66, it is preferable, for more balanced flux flow between the rotor pole faces and field poles and smoother running of the rotor, to provide both non-polarized rotor areas 60 and, hence, reduce the number of pole faces to four below the number of field poles. It thus follows that by peripheral magnetization of rotors the number of pole faces may be reduced below the number of field poles by one, two or more pairs of pole faces.

Reference is now had to FIG. 9 which shows part of a rotor magnetization fixture 70 having a ferromagnetice "field" plate 72 with an aperture 74 in which is received with a fairly close fit a rotor blank R of permanently magnetizable material, preferably high coercive magnet material. Preferably embedded in electrical insulation 76 in spaced grooves 78 in and around the plate aperture 74 are electrical conductors 80 which extend axially of the rotor blank R and have cross-connections 81 and 83 at their ends in such wise that they and their cross-connections form a continuous conductor laced around the periphery of the rotor blank and adapted for connection with a D.C. source, with successive individual conductors 80 being cross-connected alternately on opposite sides of the rotor blank. Hence, on applying a large current pulse to this continuous conductor, the current will pass through the successive individual conductors 80 in opposite directions and produce in the rotor blank R and surrounding field plate 72 magnetic circuits about the respective conductors 80, with flux flow being in opposite directions in successive circuits to impart opposite polarities to successive pole faces. The ensuing "peripheral" flux in the now magnetized rotor blank R is indicated in FIG. 9 by the dotted-line scalloped rotor regions denoted by the reference character $a$, and the magnetized pole faces on the rotor blank are indicated at $b$ in FIG. 10, with successive pole faces having the exemplary indicated opposite polarities N and S.

It follows from the preceding that the individual conductors 80 delineate the pole faces. To this end the conductors 80, except the conductor 80′, are of sufficiently small size cross-sectionally to have the circuitous flux therearound intersect the rotor blank periphery as close as possible to the delineation of successive pole faces, with the pole face delineation being indicated in FIG. 10 by the narrowly spaced lines 82 that also indicate the substantial continuity of successive pole faces thereat. The other conductor 80′ is of far greater width peripherally of the rotor blank than are the other conductors 80, and is adapted to provide a non-polarized area 84 between otherwise substantially continuous pole faces (FIG. 10). Thus, when the applied D.C. pulse passes through the wide conductor 80′, flux in the ensuing magnetic circuit will not intersect a peripheral region of the rotor blank opposite and substantially over the peripheral width of this conductor, as shown by the dotted lines $a'$ thereat (FIG. 9), wherefore this peripheral rotor region will remain non-polarized as indicated at 84 in FIG. 10, but the pole faces next to and on opposite sides of this non-polarized rotor area will be of opposite polarities the same as all other successive pole faces, as follows clearly from FIG. 9. In view of the foregoing, the manner in which the described rotors 24, 24a, 24b and 24c with their different pole face arrangements may be peripherally magnetized is now clear.

While in all rotor forms described so far the grouped pole faces thereof are substantially continuous with each other, it is also within the purview of the present invention to space also the pole faces in each group. Thus, FIG. 11 shows a rotor 24d which has two exemplary groups g7 of pole faces f of which the pole faces of each group are spaced from each other. To this end, the rotor periphery is provided with two opposite non-polarized areas 90 which divide the pole faces into the two spaced groups g7, with the rotor periphery being further provided with non-polarized areas 92 which space the pole faces of each group from each other. Like the other rotor forms, the present rotor 24d has equal numbers of pole faces of opposite polarities, and its overall number of pole faces is in this instance equal to the number of field poles 40d and 42d. Further, the two pole face groups g7 are identical and diametrically opposite each other. In the present instance, a predominant number of the pole faces in each group are spaced substantially at the field pole pitch and are of substantially the same peripheral widths as the field poles. The unbalance of the pole faces relative to the field poles for rotor self-starting is introduced in each group of pole faces in this instance by one peripherally wider pole face fd and one peripherally narrower pole face fd′ which angularly displace the normal-width pole faces f therebetween, in this instance two, with the pole faces fd and fd′ and normal-width pole faces f therebetween being out of alignment with adjacent field poles and each extending even in overlap with two adjacent field poles when the remaining pole faces of the group are in alignment with adjacent field poles, as shown. Accordingly, the present rotor 24d has in any rotor repose position sufficient overall pole face unbalance relative to the field poles for a reliable and immediate self-start on reenergization of the field coil. The present rotor 24d is, like the other described rotors, magnetized by peripheral magnetization, with the pole-face delineating conductors in the magnetization fixture (FIG. 9) being of adequate peripheral widths to form the non-polarized areas 90 and 92 of equal width on the rotor periphery.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a self-starting synchronous motor, the combination with a field having two sets of field poles arranged circularly about an axis of which successive poles of one set alternate with successive poles of the other set, and an associated field coil adapted on energization to produce opposite instantaneous polarities in said pole sets, of a permanent-magnet rotor turnable about said axis and having on its periphery polarized and non-polarized areas of peripheral widths of which said polarized areas are pole faces at least part of which are of larger peripheral width than the field poles, with successive ones of said pole faces being of opposite polarities and the number of pole faces of one polarity being equal to the number of pole faces of the opposite polarity, and said non-polarized areas divide said pole faces into spaced groups, with said areas having an overall pitch relation different from that of the field poles and being of such peripheral widths that successive pole faces of each group confront successive field poles in any rotor position and said pole faces have in any rotor repose position adequate overall unbalance relative to the field poles for a self-start of the rotor on reenergization of said coil.

2. The combination in a self-starting synchronous motor as set forth in claim 1, in which the number of pole faces is equal to the number of field poles.

3. The combination in a self-starting synchronous motor as set forth in claim 1, in which the pole faces number less than the field poles.

4. In a self-starting synchronous motor, the combination with a field having two sets of field poles arranged circularly about an axis of which successive poles of one set alternate with successive poles of the other set, and an associated field coil adapted on energization to produce opposite instantaneous polarities in said pole sets, of a permanent-magnet rotor turnable about said axis and having on its periphery polarized and non-polarized areas of peripheral widths of which said polarized areas are pole faces at least a predominant number of which are of larger peripheral width than the field poles, with successive ones of said pole faces being of opposite polarities and the number of pole faces of one polarity being equal to the number of pole faces of the opposite polarity, and said non-polarized areas divide said pole faces into spaced groups of which the pole faces of each group are substantially continuous with each other, with said areas having an overall pitch relation different from that of the field poles and being of such peripheral widths that successive pole faces of each group confront successive field poles in any rotor position and said pole faces have in any rotor repose position adequate overall unbalance relative to the field poles for a self-start of the rotor on reenergization of said coil.

5. The combination in a self-starting synchronous motor as set forth in claim 4, in which said rotor areas are arranged so that each polarized and non-polarized area has a diametrically opposite polarized and non-polarized identical counter area, respectively.

6. The combination in a self-starting synchronous motor as set forth in claim 4, in which the overall area of the pole faces of one polarity is equal to the overall area of the pole faces of the opposite polarity.

7. The combination in a self-starting synchronous motor as set forth in claim 4, in which a least a predominant number of pole faces in each group are spaced substantially at the field pole pitch.

8. The combination in a self-starting synchronous motor as set forth in claim 4, in which the pole faces of certain ones of said groups are spaced substantially at the field pole pitch and may simultaneously align with successive field poles while the pole faces of the remaining groups are out of alignment with field poles.

9. The combination in a self-starting synchronous motor as set forth in claim 4, in which said pole faces are less in number than the field poles, the pole faces of each group are spaced substantially at the field pole pitch, and the pole faces of certain ones of said groups may simultaneously align with successive field poles while the pole faces of the remaining groups are out of alignment with field poles.

10. The combination in a self-starting synchronous motor as set forth in claim 4, in which the pole faces of certain ones of said groups are spaced substantially at the field pole pitch and may simultaneously align with successive field poles while the pole faces of the remaining groups are out of alignment with field poles, and a predominant number of the pole faces of said remaining groups are spaced substantially at the field pole pitch.

11. The combination in a self-starting synchronous motor as set forth in claim 4, in which said pole faces are equal in number to the field poles, each of said non-polarized rotor areas is of smaller width than a field pole, the pole faces of certain ones of said groups are spaced substantially at the field pole pitch and may simultaneously align with successive field poles while the pole faces of the remaining groups are out of alignment with field poles, and a predominant number and the remainder of the pole faces of said remaining groups are spaced substantially at the field pole pitch and at a pitch smaller than the field pole pitch, respectively.

12. The combination in a self-starting synchronous motor as set forth in claim 4, in which each of said groups of pole faces has first and second pole faces spaced substantially at the field pole pitch and at a pitch different from the field pole pitch, respectively.

13. The combination in a self-starting synchronous motor as set forth in claim 4, in which all pole faces are of the same peripheral widths, and said non-polarized areas are of such peripheral widths that part and the remainder of said pole faces are in and out of alignment with field poles, respectively, in a certain rotor position.

14. The combination in a self-starting synchronous motor as set forth in claim 4, in which there are four of said non-polarized rotor areas, said pole faces are four less in number than the field poles, the pole faces of each group are spaced substantially at the field pole pitch, and said non-polarized areas are of such peripheral widths that the pole face groups are arranged in two series each of diametrically opposite identical groups of which the pole faces of one series may simultaneously align with successive field poles while the pole faces of the other series are out of alignment with field poles.

15. The combination in a self-starting synchronous motor as set forth in claim 4, in which all pole faces are of the same peripheral widths and the pole faces of each group are spaced at less than field pole pitch.

16. In a self-starting synchronous motor, the combination with a field having two sets of field poles arranged circularly about an axis of which successive poles of one set alternate with successive poles of the other set, and an associated field coil adapted on energization to produce opposite instantaneous polarities in said pole sets, of a permanent-magnet rotor turnable about said axis and having on its periphery polarized and non-polarized areas of peripheral widths of which said polarized areas are pole faces, with successive ones of said pole faces being of opposite polarities and the number of pole faces of one polarity being equal to the number of pole faces of the opposite polarity, and said non-polarized areas divide said pole faces into spaced groups, said rotor periphery having also non-polarized peripheral gaps between successive pole faces of each group, with said rotor areas having an overall pitch relation different from that of the field poles and being of such peripheral widths that successive pole faces of each group confront successive field poles in any rotor position and said pole faces have in any rotor repose position adequate overall unbalance relative to the field poles for a self-start of the rotor on reenergization of said coil.

17. The combination in a self-starting synchronous motor as set forth in claim 16, in which said pole faces are equal in number to the field poles, and said non-polarized areas and gaps are of identical peripheral widths.

18. A self-starting rotor for a sychronous motor with circularly arranged field poles of substantially uniform pitch, comprising a permanent-magnet disc with a cylindrical periphery having thereon polarized and non-polarized areas of peripheral widths of which said polarized areas are pole faces equal in number to the field poles with successive ones of said pole faces being of opposite polarities and the number of pole faces of one polarity being equal to the number of pole faces of the opposite polarity, and said non-polarized areas divide said pole faces into spaced groups of which the pole faces of each group are substantially continuous with each other, with a predominant number and the remainder of said substantially continuous pole faces being spaced substantially as the field pole pitch and at a pitch less than the field pole pitch, respectively.

19. A self-starting rotor for a synchronous motor with circularly arranged field poles of substantially uniform pitch, comprising a permanent-magnet disc with a cylindrical periphery having thereon polarized and non-polarized areas of peripheral widths of which said polarized areas are pole faces numbering less than the field poles, with successive ones of said pole faces being of opposite polarities and the number of pole faces of one polarity being equal to the number of pole faces of the opposite polarity, and said non-polarized areas divide said pole faces into spaced groups of which the pole faces of each group are substantially continuous with each other and spaced substantially at the field pole pitch, with said non-polarized areas being of such peripheral widths that successive pole face groups are spaced at a pitch different from the field pole pitch.

References Cited
UNITED STATES PATENTS

| | | | |
|---|---|---|---|
| 2,432,573 | 12/1947 | Jorgensen | 310—164 |
| 2,951,957 | 9/1960 | Eigeman | 310—164 |
| 3,149,256 | 9/1964 | Kohlhagen | 310—156 |

MILTON O. HIRSHFIELD, *Primary Examiner.*

L. L. SMITH, *Assistant Examiner.*